US009815484B2

(12) United States Patent
Suzuki

(10) Patent No.: US 9,815,484 B2
(45) Date of Patent: Nov. 14, 2017

(54) BRAKE APPARATUS

(71) Applicant: KYB Corporation, Tokyo (JP)

(72) Inventor: Tsutomu Suzuki, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/031,014

(22) PCT Filed: Jul. 7, 2015

(86) PCT No.: PCT/JP2015/069563
§ 371 (c)(1),
(2) Date: Apr. 21, 2016

(87) PCT Pub. No.: WO2016/009905
PCT Pub. Date: Jan. 21, 2016

(65) Prior Publication Data
US 2016/0264158 A1 Sep. 15, 2016

(30) Foreign Application Priority Data
Jul. 18, 2014 (JP) .................. 2014-147641

(51) Int. Cl.
F16D 55/08 (2006.01)
B61H 5/00 (2006.01)
(Continued)

(52) U.S. Cl.
CPC ........... B61H 5/00 (2013.01); F16D 55/2255 (2013.01); F16D 65/18 (2013.01); F16D 65/44 (2013.01);
(Continued)

(58) Field of Classification Search
CPC ... B61H 5/00; F16D 55/2245; F16D 2125/28; F16D 2125/64; F16D 2125/645; F16D 2125/68
See application file for complete search history.

(56) References Cited

U.S. PATENT DOCUMENTS 2,348,078 A * 5/1944 Ledwinka ................ B61H 5/00
188/107
3,489,022 A * 1/1970 Krahl ....................... B61H 5/00
188/59
(Continued)

FOREIGN PATENT DOCUMENTS

CN 202468679 U 10/2012
DE 2156629 A1 5/1973
(Continued)

OTHER PUBLICATIONS

Abstract of WO 2016027582 (no date).*
Abstract of WO 2016027609 (no date).*
Abstract of WO 2015182400 (2017).*

Primary Examiner — Nicholas J Lane
(74) Attorney, Agent, or Firm — Rabin & Berdo, P.C.

(57) ABSTRACT

A brake apparatus includes a coupling member configured to couple one end parts of a pair of link arms, an actuator mounted on the coupling member and configured to advance and retract an output member, a lever rotatably coupled to the output member and configured to rotate by advancing and retracting movements of the output member and a booster unit provided on at least one of the one end parts of the pair of link arms and configured to rotate the link arms with supporting portions as fulcrums by boosting a force transmitted by the rotation of the lever.

4 Claims, 2 Drawing Sheets

(51) Int. Cl.
*F16D 55/2255* (2006.01)
*F16D 65/18* (2006.01)
*F16D 65/44* (2006.01)
*F16D 55/224* (2006.01)
*F16D 125/28* (2012.01)

(52) U.S. Cl.
CPC ...... *F16D 55/2245* (2013.01); *F16D 2125/28* (2013.01)

(56) References Cited

U.S. PATENT DOCUMENTS

| | | | | |
|---|---|---|---|---|
| 3,722,636 | A | * | 3/1973 | Kobelt ............... F16D 55/2245 188/170 |
| 4,236,608 | A | * | 12/1980 | Kobelt .................... B61H 7/12 188/43 |
| 4,308,937 | A | * | 1/1982 | Johnson ................. B61H 7/12 104/17.1 |
| 5,813,499 | A | | 9/1998 | Staltmeir et al. |
| 6,722,477 | B1 | * | 4/2004 | Wolfsteiner ............. B61H 5/00 188/173 |
| 2010/0044165 | A1 | * | 2/2010 | Argirovski .......... F16D 55/2245 188/71.8 |
| 2010/0294601 | A1 | * | 11/2010 | Kraus ................... B60T 17/083 188/72.2 |
| 2014/0326547 | A1 | | 11/2014 | Yano et al. |

FOREIGN PATENT DOCUMENTS

| | | | |
|---|---|---|---|
| EP | 0699846 A2 | 3/1996 | |
| EP | 2431251 A1 | 3/2012 | |
| JP | H10-505038 A | 5/1998 | |
| JP | WO 2015182400 A1 * | 3/2015 | ............... B61H 5/00 |
| JP | WO 2016027582 A1 * | 2/2016 | ............... B61H 5/00 |
| JP | WO 2016027609 A1 * | 2/2016 | ............... B61H 5/00 |
| WO | WO 2008-123430 A1 | 10/2008 | |
| WO | WO 2013-077273 A1 | 5/2013 | |

* cited by examiner

BRAKE APPARATUS

TECHNICAL FIELD

The present invention relates to a brake apparatus.

BACKGROUND ART

Conventionally, a brake apparatus has been used which brakes the rotation of a wheel by causing a force by an actuator to act on points of force of a pair of link arms rotatable about fulcrums and causing brake linings supported on points of action of the link arms to slide in contact with a brake disc.

JP10-505038A discloses a brake caliper unit in which one end parts of caliper levers are coupled to each other, the other end parts are respectively rotationally mounted on brake pads and an eccentric body transmission device provided on a fulcrum between the both end parts of the caliper levers rotates the caliper levers. The eccentric body transmission device includes an eccentric pin configured to rotate by receiving a force by a braking force generator and rotates the caliper levers about the one end parts by the rotation of this eccentric pin.

SUMMARY OF INVENTION

However, in the caliper brake unit of JP10-505038A, circumferential tangential forces acting on the brake pads from the brake disc during braking in which the brake pads slide in contact with the brake disc act on the eccentric pin of the eccentric body transmission device. Thus, a large force is necessary to rotate the eccentric pin during braking and it has been difficult to improve mechanical efficiency.

The present invention aims to improve the mechanical efficiency of a brake apparatus.

According to one aspect of this invention, a brake apparatus for braking by sandwiching a brake disc rotating together with a wheel, includes: a brake main body supported on a vehicle body or a truck; a pair of link arms having supporting portions between one and other end parts rotatably supported on the brake main body, the pair of link arms being respectively provided to face both surfaces of the brake disc, the pair of link arms being configured such that the other end parts support brake linings for giving a frictional force by sliding in contact with the brake disc; a coupling member configured to couple the one end parts of the pair of link arms; an actuator mounted on the coupling member, the actuator being configured to advance and retract an output member; a lever rotatably coupled to the output member of the actuator, the lever being configured to rotate by advancing and retracting movements of the output member; and a booster unit provided on at least one of the one end parts of the pair of link arms, the booster unit being configured to rotate the link arms with the supporting portions as fulcrums by boosting a force transmitted by the rotation of the lever.

DESCRIPTION OF EMBODIMENT

Figure 1:
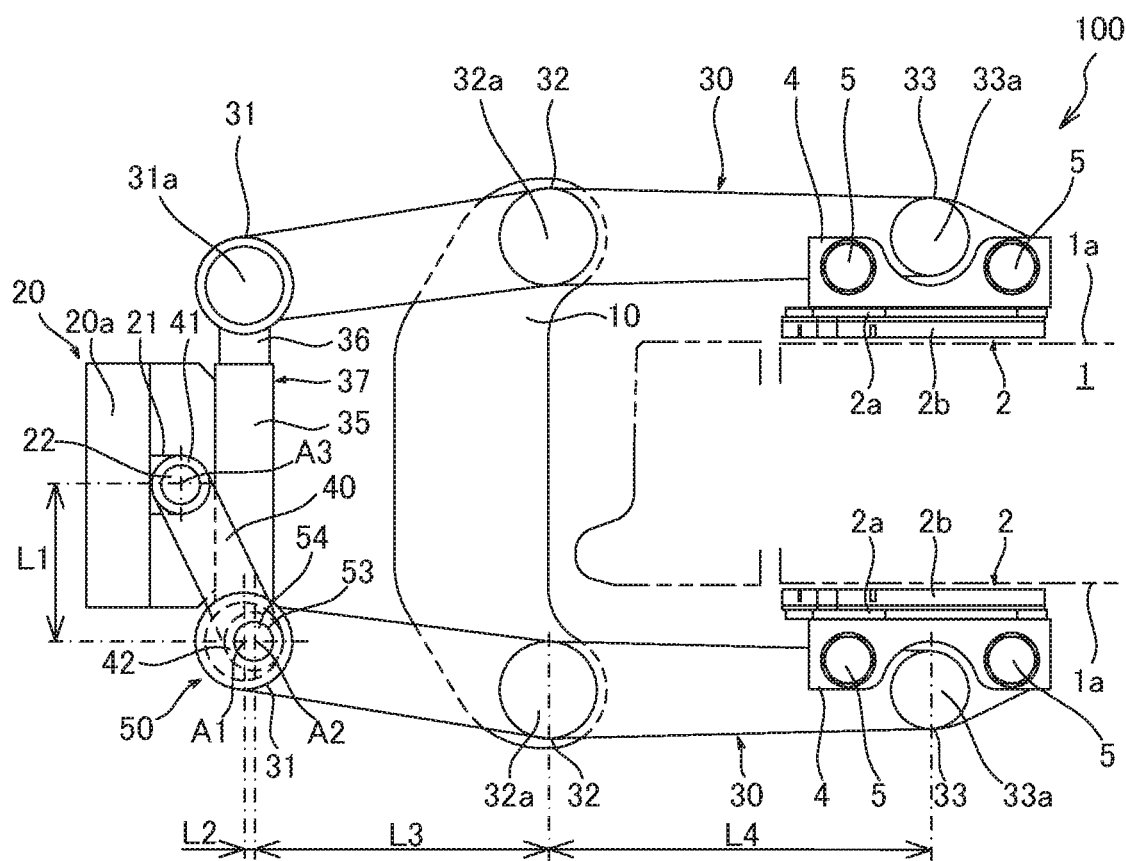
FIG. 1 is a plan view of a brake apparatus according to an embodiment of the present invention.

Hereinafter, an embodiment of the present invention is described with reference to the drawings.

First, the configuration of a brake apparatus 100 according to the embodiment of the present invention is described with reference to FIGS. 1 and 2.

The brake apparatus 100 is mainly applied to railway vehicles. The brake apparatus 100 brakes a wheel 1 by sandwiching brake discs 1a rotating together with the wheel 1. Specifically, the brake apparatus 100 brakes the rotation of the wheel 1 by frictional forces between the brake discs 1a and brake linings 2 by sandwiching the brake discs 1a from opposite sides by a pair of brake linings 2.

The brake discs 1a are formed on both sides of the wheel 1 and integrally rotate with the wheel 1. Instead of a configuration in which the brake discs 1a are integrally formed to the wheel 1, a separate brake disc 1a configured to rotate together with the wheel 1 may be provided.

The brake linings 2 face the brake discs 1a with a predetermined interval set in advance therebetween (state shown in FIG. 1) when braking is not applied. The brake linings 2 move toward the brake discs 1a and are pressed into contact with the brake discs 1a in parallel during braking.

The brake lining 2 includes a back plate portion 2a supported on a lining holding portion 3 of the brake apparatus 100 and a friction member 2b configured to come into contact with the brake discs 1a during braking. The friction member 2b is composed of a plurality of segments and fixed to a surface of the back plate portion 2a. The brake linings 2 brake the rotation of the wheel 1 by a frictional force generated by the contact of the friction member 2b and the brake discs 1a.

The lining holding portion 3 includes dovetail grooves (not shown) into which the back plate portions 2a of the brake linings 2 are to be inserted. Anchor blocks 4 to be fixed to the lining holding portion 3 are respectively provided on upper and lower end parts of the lining holding portion 3 by a pair of anchor bolts 5. The anchor blocks 4 fix end parts of the back plate portions 2a of the brake linings 2 in a longitudinal direction (vertical direction in FIG. 2). This causes the brake linings 2 inserted into the dovetail grooves to be held on the lining holding portion 3.

The brake apparatus 100 includes a brake main body 10, a pair of link arms 30 having supporting portions 32 between one end parts 31 and other end parts 33 rotatably supported on the brake main body 10, a coupling rod 35 as a coupling member for coupling the one end parts of the pair of link arms 30, an actuator 20 mounted on the coupling rod 35 and configured to advance and retract a rod 21 as an output member, levers 40 rotatably coupled to the rod 21 of the actuator 20 and configured to rotate by advancing and retracting movements of the rod 21, and a booster unit 50 provided on at least one of the one end parts 31 of the pair of link arms 30 and configured to rotate the link arms 30 with the supporting portions 32 as fulcrums by boosting a force transmitted by the rotation of the levers 40.

The brake main body 10 is supported on a truck (not shown) when the brake apparatus 100 is applied to a railway vehicle. The brake main body 10 is supported on a vehicle body (not shown) when the brake apparatus 100 is applied to a vehicle other than railway vehicles.

The actuator 20 is a fluid pressure actuator configured to be operated by a liquid pressure such as a hydraulic pressure or a pressure of working fluid such as a pneumatic pressure. Without limitation to this, the actuator 20 may be of another type such as a mechanical actuator configured to be operated by the rotation of an electric motor. The actuator 20 operates on the basis of a braking operation of a driver and advances and retracts the rod 21 relative to an actuator main body 20a mounted on the coupling rod 35.

The actuator 20 is provided at a position more distant from the supporting portions 32 than the one end parts 31 of the link arms 30. That is, the actuator 20 is provided to face the brake main body 10 across the coupling rod 35. Since the actuator 20 is provided outside an area enclosed by the coupling rod 35 and the pair of link arms 30 in this way, a degree of freedom in designing the link arms 30 is improved. Thus, the link arms 30 can be shortened, wherefore the brake apparatus 100 can be reduced in size and weight.

Figure 2:
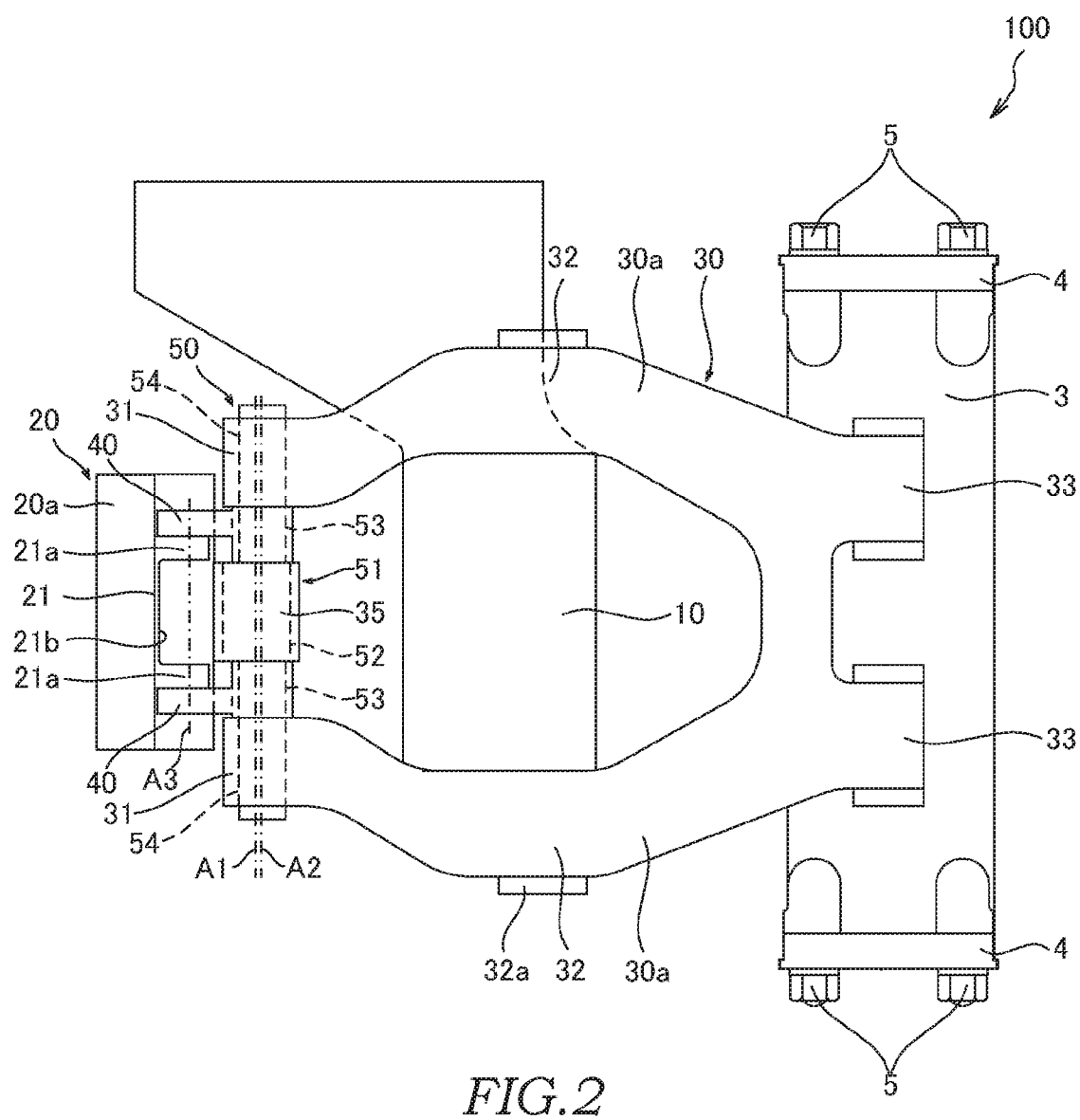
FIG. 2 is a front view of the brake apparatus according to the embodiment of the present invention.

As shown in FIG. 2, the rod 21 includes coupling portions 21a respectively coupled to the pair of levers 40 and a recess portion 21b formed between the pair of coupling portions 21a and is formed into a U shape. The recess portion 21b prevents the interference of the rod 21 and the coupling rod 35 when the rod 21 is retracted from the actuator main body 20a. Thus, when the rod 21 is retracted from the actuator main body 20a, the coupling rod 35 enters the recess portion 21b and the pair of coupling portions 21a extend while avoiding the coupling rod 35.

The rod 21 includes a pair of coupling shafts 22, to which the levers 40 are respectively rotatably coupled, on the coupling portions 21a (see FIG. 1). The pair of coupling shafts 22 are coaxially provided. The coupling shafts 22 are arranged such that center axis thereof are parallel to the brake linings 2. Centers of the brake discs 1a are located on an extension of a center axis along which the rod 21 reciprocates. The rod 21 can be advanced and retracted relative to the actuator main body 20a and swing in a movable direction of the brake linings 2 (vertical direction in FIG. 1).

As shown in FIG. 1, the link arms 30 are respectively provided to face both surfaces of the brake discs 1a. The one end parts 31 of the pair of link arms 30 are coupled by the coupling rod 35. The other end parts 33 of the link arms 30 swingably support the brake linings 2 configured to give frictional forces by sliding in contact with the brake discs 1a. As shown in FIG. 2, the link arm 30 is formed into a substantially U shape having a pair of arm portions 30a provided on upper and lower sides.

As shown in FIG. 1, a coupling shaft 31a coupling the coupling rod 35 and the link arm 30 by penetrating therethrough is provided on the one end part 31 of one link arm 30. The booster unit 50 coupling the coupling rod 35, the link arm 30 and the pair of levers 40 by penetrating therethrough and configured to rotate the link arms 30 by boosting a force given by advancing and retracting movements of the rod 21 of the actuator 20 is provided on the one end part 31 of the other link arm 30.

Instead of this configuration, the booster units 50 may be provided on both the one end part 31 of the one link arm 30 and the one end part 31 of the other link arm 30. In that case, each booster unit 50 can rotate each of the one and other link arms 30. The booster unit 50 is described in detail later.

An arm shaft 32a coupling the link arm 30 and the brake main body 10 by penetrating therethrough is provided on the supporting portion 32 of the link arm 30. The link arm 30 is rotatably supported on the brake main body 10 by the arm shaft 32a. A circumferential tangential force acting on the brake lining 2 from the brake disc 1a during the braking of the brake apparatus 100 acts on the brake main body 10 via the arm shaft 32a from the supporting portion 32.

A lining shaft 33a coupling the link arm 30 and the lining holding portion 3 by penetrating therethrough is provided on the other end part 33 of the link arm 30. The lining holding portion 3 is rotatably supported on the link arm 30 by the lining shaft 33a. In this way, the brake lining 2 is made swingable relative to the link arm 30 and can constantly come into contact with the brake disc 1a in parallel during braking.

The levers 40 transmit the force by advancing and retracting movements of the rod 21 of the actuator 20 to the booster unit 50. One end part 41 of the lever 40 is rotatably coupled to the coupling shaft 22 of the rod 21. Another end part 42 of the lever 40 is unrotatably coupled to a later-described eccentric portion 53 of the booster unit 50.

The lever 40 rotates between the coupling shaft 22 and the eccentric portion 53 when the rod 21 is advanced and retracted relative to the actuator main body 20a. The lever 40 rotates to a position where it is parallel to the coupling rod 35 in a state where the rod 21 is most retracted from the actuator main body 20a.

As shown in FIG. 2, the booster unit 50 includes an eccentric cam 51 configured to rotate about an axis of rotation A1 by the rotation of the levers 40. The axis of rotation A1 of the eccentric cam 51 is provided at the same position as a center axis of the coupling shaft 31a relative to the link arm 30.

The eccentric cam 51 includes a large-diameter portion 52 rotatably coupled to the coupling rod 35, the eccentric portions 53 having a center axis A2 at a position offset from the axis of rotation A1 of the eccentric cam 51 and configured to rotate along an arcuate path centered on the axis of rotation A1 by the rotation of the levers 40, and a pair of arm coupling portions 54 formed coaxially with the eccentric portions 53 and rotatably supported on the link arm 30.

The large-diameter portion 52 is formed to have the same outer diameter as the coupling shaft 31a. A center axis of the large-diameter portion 52 is the axis of rotation A1 of the eccentric cam 51.

The eccentric portions 53 are formed to have a smaller diameter than the large-diameter portion 52. The eccentric portions 53 are respectively provided at opposite axial sides of the large-diameter portion 52. The levers 40 are relatively unrotatably coupled to the eccentric portions 53. Thus, when the rod 21 is advanced and retracted relative to the actuator main body 20a and the levers 40 rotate, the eccentric portions 53 rotate along the arcuate paths centered on the axis of rotation A1.

The arm coupling portions 54 are formed to have the same diameter as the eccentric portions 53. The arm coupling portions 54 are provided at opposite sides of the large-diameter portion 52 across the eccentric portions 53. Instead of this, the arm coupling portions 54 may be formed to have a smaller diameter than the eccentric portions 53. Further, the arm coupling portions 54 may be respectively provided between the eccentric portions 53 and the large-diameter portion 52.

As just described, the eccentric cam 51 includes the large-diameter portion 52 in a center, the eccentric portions 53 having a smaller diameter than the large-diameter portion 52 at opposite ends thereof and the arm coupling portions 54 having a diameter equal to or smaller than the eccentric portions 53 at further opposite ends thereof. Thus, the eccentric cam 51 is narrowed in diameter in a stepwise manner from the center toward the opposite end parts, wherefore processing is easy. Further, since the coupling rod 35, the levers 40, and the link arm 30 can be successively assembled with the eccentric cam 51, its assemblability is good.

The brake apparatus 100 further includes an adjuster 37 for extending the coupling rod 35 according to an amount of abrasion of the brake linings 2. The adjuster 37 is provided outside a range where the actuator 20 is mounted. The adjuster 37 extends the coupling rod 35 by extending an adjustment rod 36. When the brake apparatus 100 is set in a braking state and the brake linings 2 are abraded, an adjustment screw (not shown) provided in the coupling rod 35 rotates and the adjuster 37 extends the adjustment rod 36.

Since the adjuster 37 is provided outside the range where the actuator 20 for the coupling rod 35 is mounted, even if the brake linings 2 are abraded and the coupling rod 35 extends, a positional relationship of the actuator 20 and the booster unit 50 does not change. Thus, even if the brake linings 2 are abraded, it is possible not to change operation characteristics of the actuator 20.

Next, functions of the brake apparatus 100 are described.

The brake apparatus 100 enters a braking state from a non-braking state (state shown in FIGS. 1 and 2) when the actuator 20 operates on the basis of a braking operation of the driver.

When the actuator 20 operates and the rod 21 is retracted from the actuator main body 20a, the levers 40 rotate by being pushed by the coupling shafts 22. A force of the actuator 20 for retracting the rod 21 is transmitted to the eccentric portions 53 of the eccentric cam 51 via the levers 40.

The eccentric cam 51 rotates in one direction (clockwise direction in FIG. 1) by the rotation of the eccentric portions 53 along the arcuate paths centered on the axis of rotation A1 due to the force transmitted via the levers 40. Since this causes the arm coupling portions 54 to integrally rotate with the eccentric portions 53 in a direction away from the rod 21, the one end parts 31 of the pair of link arms 30 move in directions to separate from each other.

Since the link arms 30 are rotatably supported on the brake main body 10 by the supporting portions 32, if the one end parts 31 move in the directions to separate from each other, the other end parts 33 move in directions to approach each other. Thus, the brake linings 2 move toward the brake discs 1a and are pressed into contact with the brake discs 1a in parallel to brake the rotation of the wheel 1.

At this time, the eccentric cam 51 transmits a force transmitted from the rod 21 to the levers 40 to the link arms 30 by boosting the force by a factor of L1/L2 by a lever ratio of a distance L1 between an axis of rotation A3 of the coupling shaft 22 and the axis of rotation A1 and a distance L2 between the axis of rotation A1 and the center axis A2 of the eccentric portions 53. Thus, a large braking force can be obtained without providing a large-size actuator. Therefore, the brake apparatus 100 can be reduced in size and weight.

Further, the supporting portion 32 of the link arm 30 between the one end part 31 and other end parts 33 is rotatably supported on the brake main body 10. The eccentric cam 51 configured to rotate the link arms 30 by boosting the force transmitted from the rod 21 by the rotation of the levers 40 is provided on the one end part 31 of the link arm 30. Thus, circumferential tangential forces acting on the brake linings 2 from the brake discs 1a during the braking of the brake apparatus 100 act on the arm shafts 32a of the supporting portions 32 and do not act on the eccentric cam 51. Thus, frictional resistance when the eccentric cam 51 rotates does not become large, wherefore mechanical efficiency during the braking of the brake apparatus 100 can be improved.

The force transmitted to the one end part 31 of the link arm 30 from the eccentric cam 51 is boosted by a factor of L3/L4 by a lever ratio of a distance L3 between the one end part 31 and the supporting portion 32 and a distance L4 between the supporting portion 32 and the other end part 33.

Since the distance L4 is longer than the distance L3 in the brake apparatus 100, a force for pressing the brake lining 2 against the brake disc 1a is smaller than the force transmitted to the one end part 31 of the link arm 30 from the eccentric cam 51.

However, in the brake apparatus 100, the force transmitted from the rod 21 of the actuator 20 via the levers 40 by the eccentric cam 51 is boosted by a large factor. Thus, a sufficiently large braking force can be obtained even if the link arms 30 are shortened to reduce the distance L3 for a size and weight reduction of the brake apparatus 100.

In the brake apparatus 100, a degree of design freedom of the positions of the arm shafts 32a of the supporting portions 32 is increased by providing the eccentric cam 51 on the one end part 31 of the link arm 30. Thus, it is also possible to arrange the arm shafts 32a at positions facing a side surface of the wheel 1. Therefore, the distance L3 can be made longer than the distance L4 and the brake linings 2 can be pressed against the brake discs 1a by further boosting the force boosted by the eccentric cam 51.

The brake apparatus 100 enters the non-braking state (state shown in FIGS. 1 and 2) from the braking state when the actuator 20 operates in a direction opposite to that during braking based on a brake releasing operation of the driver.

When the actuator 20 operates and the rod 21 enters the actuator main body 20a, the levers 40 rotate by being pulled by the coupling shafts 22. A force of the actuator 20 for causing the rod 21 to enter is transmitted to the eccentric portions 53 of the eccentric cam 51 via the levers 40.

The eccentric cam 51 rotates in the other direction (counterclockwise direction in FIG. 1) by the rotation of the eccentric portions 53 along the arcuate paths centered on the axis of rotation A1 due to the force transmitted via the levers 40. This causes the one end parts 31 of the pair of link arms 30 to move in directions to approach each other. Thus, the other end parts 33 of the pair of link arms 30 move in directions to separate from each other. In this way, the brake linings 2 are separated from the brake discs 1a to release the braking of the wheel 1.

According to the above embodiment, the following effects are exhibited.

The link arms 30 have the supporting portions 32 between the one end parts 31 and the other end parts 33 rotatably supported on the brake main body 10. The eccentric cam 51 for rotating the link arms 30 by boosting a force transmitted from the rod 21 by the rotation of the levers 40 is provided on the one end part 31 of the link arm 30. Thus, circumferential tangential forces acting on the brake linings 2 from the brake discs 1a during the braking of the brake apparatus 100 act on the arm shafts 32a of the supporting portions 32 and do not act on the eccentric cam 51. Accordingly, friction resistance when the eccentric cam 51 rotates does not become large, wherefore mechanical efficiency during the braking of the brake apparatus 100 can be improved.

The configuration, functions and effects of the embodiment of the present invention are summarized.

In the present embodiment, the brake apparatus 100 for braking by sandwiching the brake discs 1a rotating together with the wheel 1 includes the brake main body 10 supported on the vehicle body or the truck, the pair of link arms 30 having the supporting portions 32 between the one end parts 31 and the other end parts 33 rotatably supported on the brake main body 10, respectively facing the both sides of the brake discs 1a and configured such that the other end parts 33 support the brake linings 2 for giving a frictional force by sliding in contact with the brake discs 1a, the coupling rod 35 configured to couple the one end parts 31 of the pair of link arms 30, the actuator 20 mounted on the coupling rod 35 and configured to advance and retract the rod 21, the levers 40 rotatably coupled to the rod 21 of the actuator 20 and configured to rotate by advancing and retracting movements of the rod 21, and the boosting unit 50 provided on at least one of the one end parts 31 of the pair of link arms 30 and configured to rotate the link arms 30 with the supporting portions 32 as fulcrums by boosting a force transmitted by the rotation of the levers 40.

In this configuration, the link arms 30 have the supporting portions 32 between the one end parts 31 and the other end parts 33 rotatably supported on the brake main body 10. The eccentric cam 51 configured to rotate the link arms 30 by boosting the force transmitted from the rod 21 by the rotation of the levers 40 is provided on the one end part 31 of the link arm 30. Thus, circumferential tangential forces acting on the brake linings 2 from the brake discs 1a during the braking of the brake apparatus 100 act on the arm shafts 32a of the supporting portions 32 and do not act on the eccentric cam 51. Accordingly, friction resistance when the eccentric cam 51 rotates does not become large, wherefore mechanical efficiency during the braking of the brake apparatus 100 can be improved.

Further, in the present embodiment, the adjuster 37 is further provided which is provided outside the range where the actuator 20 for the coupling rod 35 is mounted and extends the coupling rod 35 according to the amount of abrasion of the brake linings 2.

In this configuration, since the adjuster 37 is provided outside the range where the actuator 20 for the coupling rod 35 is mounted, even if the brake linings 2 are abraded and the coupling rod 35 extends, the positional relationship of the actuator 20 and the booster unit 50 does not change. Thus, even if the brake linings 2 are abraded, it is possible not to change the operation characteristics of the actuator 20.

Further, in the present embodiment, the actuator 20 is provided at the position more distant from the supporting portions 32 than the one end parts 31 of the link arms 30.

In this configuration, since the actuator 20 is provided outside the area enclosed by the coupling rod 35 and the pair of link arms 30, a degree of freedom in designing the link arms 30 is improved. Thus, the link arms 30 can be shortened, wherefore the brake apparatus 100 can be reduced in size and weight.

Further, in the present embodiment, the booster unit 50 includes the eccentric cam 51 configured to rotate about the axis of rotation A1 by the rotation of the levers 40 and the eccentric cam 51 includes the eccentric portions 53 having the center axis A2 at the position offset from the axis of rotation A1 and configured to rotate along the arcuate paths centered on the axis of rotation A1 by the rotation of the levers 40.

Further, in the present embodiment, the eccentric cam 51 further includes the large-diameter portion 52 rotatably coupled to the coupling rod 35 and the eccentric portions 53 are formed to have a smaller diameter than the large-diameter portion 52 and respectively provided at the opposite axial sides of the large-diameter portion 52, the levers 40 being relatively unrotatably coupled thereto.

Further, in the present embodiment, the eccentric cam 51 further includes the pair of arm coupling portions 54 formed coaxially with the eccentric cams 53 and rotatably supported on the link arm 30 at the sides of the eccentric portions 53 opposite to the large-diameter portions 52 or between the eccentric portions 53 and the large-diameter portion 52.

According to these configurations, the eccentric cam 51 transmits a force transmitted from the rod 21 via the levers 40 to the link arms 30 by boosting the force by the lever ratio of the distance between the opposite end parts of the levers 40 and the distance from the axis of rotation A1 to the center axis A3 of the eccentric portions 53. Thus, a large braking force can be obtained without providing a large-size actuator. Therefore, the brake apparatus 100 can be reduced in size and weight.

Embodiments of this invention were described above, but the above embodiments are merely examples of applications of this invention, and the technical scope of this invention is not limited to the specific constitutions of the above embodiments.

For example, in the aforementioned embodiment, the actuator 20 is provided outside the area enclosed by the coupling rod 35 and the pair of link arms 30. However, without limitation to this configuration, the actuator 20 has only to be mounted on the coupling rod 35, wherefore the actuator 20 may be provided inside the area enclosed by the coupling rod 35 and the pair of link arms 30.

Further, the rod 21 of the actuator 20 and the levers 40 may be covered by a cover member (not shown) mounted on the coupling rod 35. This enables the rod 21 and the levers 40 operating during the braking of the brake apparatus 100 to be protected.

This application claims priority based on Japanese Patent Application No. 2014-147641 filed with the Japan Patent Office on Jul. 18, 2014, the entire contents of which are incorporated into this specification.

The invention claimed is:

1. A brake apparatus for braking by sandwiching a brake disc between brake linings, the brake disc rotating together with a wheel, comprising:
    a brake main body supported on a vehicle body or a truck;
    a pair of link arms each having one and other end parts and a supporting portion between the one and the other end parts, each of the link arms
        being rotatably supported on the brake main body,
        being respectively provided to face a respective surface of the brake disc, and
        being configured such that the other end part supports a corresponding one of the brake linings for giving a frictional force by sliding in contact with the brake disc;
    a coupling member configured to couple the one end part of each of the link arms together;
    an output member;
    an actuator mounted on the coupling member, the actuator being configured to advance and retract the output member;
    a pair of levers, rotatably coupled to the output member of the actuator, the levers being configured to rotate by advancing and retracting movements of the output member; and
    a booster unit provided on at least one of the one end part of one of the link arms, the booster unit being configured to rotate each of the link arms, using a corresponding supporting portion as a fulcrum, by boosting a force transmitted by a rotation of each of the levers, the booster unit including an eccentric cam configured to rotate about an axis of rotation by the rotation of each of the levers, the eccentric cam including
        a large-diameter portion rotatably coupled to the coupling member, and
        a pair of eccentric portions each of which
            has a diameter smaller than a diameter of the large-diameter portion, is provided at a corresponding side of the large-diameter portion with respect to an axis direction of the large-diameter portion, has a center axis at a position offset from the axis of rotation of the eccentric cam, and is configured to rotate along an arcuate path centered on the axis of rotation of the eccentric cam by the rotation of a corresponding one of the levers, each of the levers being relatively unrotatably coupled to a corresponding one of the eccentric portions.

2. The brake apparatus according to claim 1, further comprising:

an adjuster provided outside a range where the actuator is mounted, the adjuster being configured to extend the coupling member according to an amount of abrasion of the brake linings.

3. The brake apparatus according to claim 1, wherein the actuator is provided at a position farther from the supporting portion of each of the link arms than the one end part of each of the link arms.

4. The brake apparatus according to claim 1, wherein the eccentric cam further includes a pair of arm coupling portions, each of which has an axis that is at a same position as the center axis of the eccentric portions, and is rotatably supported by the link arm at a position that is at a corresponding side of the large-diameter portion with respect to the axis direction of the large-diameter portion and at either side of a corresponding one of the eccentric portions.

* * * * *